United States Patent [19]
Pondell

[11] 3,912,090
[45] Oct. 14, 1975

[54] POWER TRAIN FOR A RING-DRIVE SILO UNLOADER

[75] Inventor: Stan A. Pondell, Fort Atkinson, Wis.

[73] Assignee: Butler Manufacturing Company, Kansas City, Mo.

[22] Filed: May 15, 1974

[21] Appl. No.: 469,949

[52] U.S. Cl. .................. 214/17 DB; 214/17 DB
[51] Int. Cl.² ............................. B65G 65/38
[58] Field of Search ..... 214/17 DA, 17 DB; 302/56; 222/404, 405

[56] References Cited
UNITED STATES PATENTS

| | | | |
|---|---|---|---|
| 2,963,327 | 12/1960 | Seymour et al. | 214/17 DB |
| 3,075,657 | 1/1963 | Hazen | 214/17 DB |
| 3,356,235 | 12/1967 | Laidig | 214/17 DA |

Primary Examiner—Robert G. Sheridan
Attorney, Agent, or Firm—Lowe, Kokjer, Kircher, Wharton & Bowman

[57] ABSTRACT

A drive mechanism for mechanical silo unloaders having a drive ring and a rotatable silage conveyor. The mechanism includes stress compensation means in the form of a drive sprocket mounting unit which supports the drive sprocket for movement relative to the ring, and in one form includes a cooperating drive shaft having sufficient flexibility to accommodate the movement. The drive sprocket mounting unit comprises an axle which facilitates pivoting in a plane perpendicular to the drive ring radius and two slide rods which allows it to move freely within defined limits in the same plane as the drive ring radius. The pivot and slide rods are transversely mounted relative to each other through a generally tubular pivot member which is attached to the mounting unit frame.

8 Claims, 7 Drawing Figures

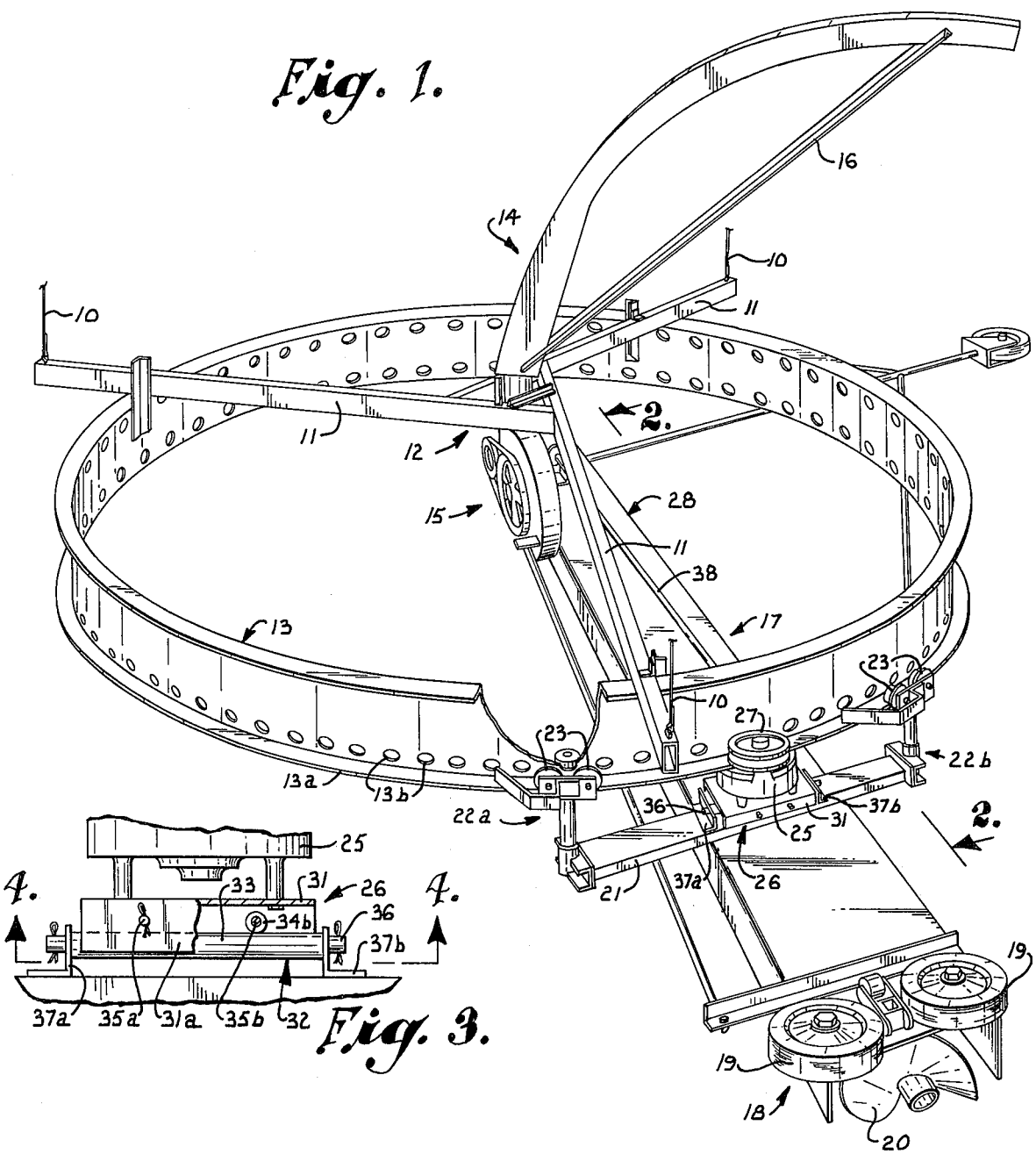
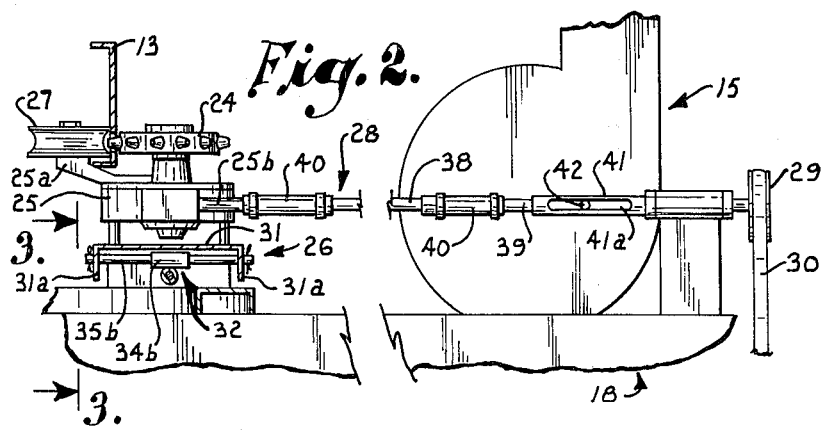

POWER TRAIN FOR A RING-DRIVE SILO UNLOADER

BACKGROUND AND SUMMARY OF THE INVENTION

This invention relates to silo unloaders, and more particularly, to an improvement for silo unloaders of the suspended, stationary ring drive type. An example of such a silo unloader is described in U.S. Pat. No. 2,963,327, issued to Seymour et al. In the patented unit, the connection between the drive ring and suspension arms is by articulatable links. The present invention is directed to an arrangement in which (1) the drive ring is rigidly affixed to the suspension arms and the sweep conveyor moves around the silo center relative to the ring, or (2) the drive ring moves around the center, the sweep conveyor being affixed to and moving with the ring.

Because of dimensional variations in the drive ring utilized by silo unloaders of the character described, and the inability to maintain perfect circularity of the ring, imperfect alignment between it and the drive sprocket occurs, which induces stress and metal fatigue in the various parts. This condition is further aggravated by temperature variations and the normal wear which occurs with use.

Another difficulty encountered with silo unloaders of the ring type is that when the misalignments referred to occur, there is an uneven power load on the prime mover (an electric motor), the loads increasing as resistance to drive increases. Not only is this not desirable from the standpoint of wear and heat build-up in the motor, but it makes it rather difficult to provide a satisfactory overload protection to the motor since factors other than silage removal influence the condition of the drive motor. Ideally, the overload protection should be dependent solely on loads imposed by silage removal.

It is a primary object of the present invention to provide a drive sprocket mounting and drive arrangement which will accommodate misalignment between the drive ring, rotating drive sprocket and suspension frame in a silo unloader, thereby increasing greatly the operating life and efficiency of the unloader.

It is a further object of this invention to provide a drive assembly for a silo unloader of the character described which will compensate for the unusual loads which occur in response to thrust forces developed by the auger when compacted bits of silage are encountered.

Other and further objects of the instant invention, together with the features of novelty appurtenant thereto, will become apparent in the course of the following description.

DESCRIPTION OF THE DRAWINGS

In the accompanying drawings, which form a part of the specification and are to be read in conjunction therewith, and in which like reference numerals are employed to indicate like parts in the various views:

FIG. 1 is a perspective view of a preferred embodiment of a top mounted silo unloader incorporating the present invention;

FIG. 2 is a fragmentary side view of the rotatable silage conveying assembly, taken generally along line 2—2 of FIG. 1 in the direction of the arrows:

FIG. 3 is a partially fragmentary and enlarged end view of the drive sprocket mounting unit, taken generally along line 3—3 of FIG. 2 in the direction of the arrows;

FIG. 4 is a bottom view of the gear box mounting unit taken along line 4—4 of FIG. 3;

Figure 5:
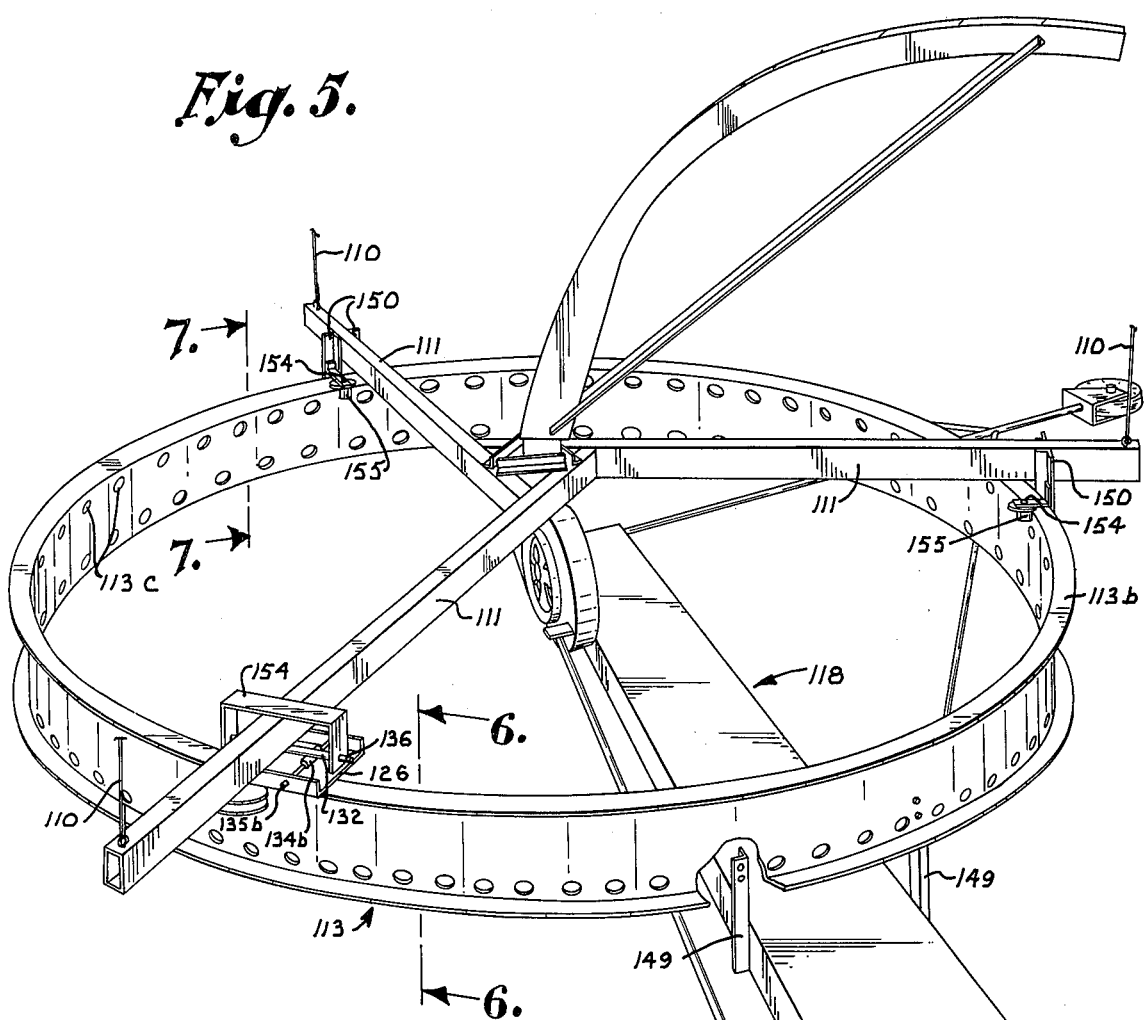
FIG. 5 is a perspective view similar to FIG. 1, but showing a modified form of silo unloader.

As is conventional, the silo unloader as seen in FIG. 1 is mounted from the top of a conventional silo (not shown), being suspended by cables 10. Arms 11, which are interconnected at the center of the silo, extend radially outwardly toward the inside surface of the silo wall. Corresponding ends of each arm are connected to corresponding intermediate points on the next succeeding arm, thereby forming a triangular central frame 12. The arms 11 support a drive ring 13, and at the aforementioned centrally located triangular frame a discharge chute 14 is mounted on impeller assembly 15. Chute 14 discharges silage through a vertical slot in the silo (not shown), and it is mechanically supported by brace 16.

Extending radially outwardly from a bearing (not shown) located underneath the triangular central intersection point of arms 12 is an auger and shroud assembly 17 which provides a silage gathering means. This assembly forms a subframe on which the impeller assembly 15 is carried. A wall wheel assembly 18 which includes wheels 19, is secured to the outward end of the silage gathering means. An auger 20 extends within the entire length of the shroud of the gathering means, terminating at the center of the device adjacent the impeller assembly 15.

A drive gearbox support arm 21 extends transversely of and is affixed to the top of the shroud. The ends of arm 21 carry drive support assemblies 22a and 22b, each of which has roller wheels 23 mounted thereto. Wheels 23 contact the lower flange 13a of the drive ring 13 in order to facilitate rotation of and provide support for silage gathering means 18.

The silage gathering means 18 is driven around the ring by means of a toothed sprocket 24 (see FIG. 2), the teeth of which are designed to interfit with holes 13b around the lower portion of the ring. The sprocket is mounted on the output shaft of a worm reduction gearbox 25.

The gearbox 25 is affixed to the top of a gearbox mounting unit 26, which in turn is centrally located on and flexibly supported from the support arm 21. The details of the connection will be provided later herein. A grooved roller 27 is also connected with the gearbox by a mounting arm, being located on the outside of the ring and cooperating with the sprocket in order to prevent inadvertent disengagement of the teeth.

As best seen in FIG. 2, the input shaft 25b to the gearbox 25 is connected with an elongated drive shaft 37 extending inwardly over the auger shroud toward the center of the unloader, and terminating at its inner end with a sheave or pulley 29. In operation, a motor (not shown, but conventional) turns pulley 29 via a belt 30, causing drive shaft 28 to rotate. The drive shaft in turn rotates the drive sprocket 24 through the action of the gearbox 25. As a result of the propulsion so developed, the gathering means 17 rotates about the center of and in a plane parallel to drive ring 13. The auger 20, which contacts the top surface of stored silage during the aforementioned motion, is itself rotated by gears (not shown), and silage is thereby delivered to the impeller assembly 15. Silage is then forcibly thrown out through discharge chute 14.

The gearbox mounting unit 26 comprises a pan-like member 31 having depending flanges 13a between which is located a pivot assembly 32. As seen in FIG. 4, pivot assembly 32 comprises a long tubular sleeve 33 to which a pair of substantially shorter, transverse sleeves 34a and 34b are affixed. Cylindrical rods 35a and 35b extend through and are slidable with respect to the sleeves 34a and 34b, respectively. The rod ends pass through openings in flanges 31a and are fastened in place by cotter pins (FIG. 3). It will be evident that by virtue of the sliding fit between rods 35a, 35b, the pan-like member 31, and thus the drive sprocket and gearbox carried thereby, are supported for limited movement radially toward and away from the center of the ring, essentially on a radius of the ring.

Extending through the long sleeve 33 of pivot assembly 32 is another rod 36 (FIG. 3). The ends of rod 36 are supported by angle brackets 37a and 37b secured to the top of the gearbox support arm 21. The rod 36 is fixed relative to the brackets by cotter pins. The member 31, and drive wheel, are thus enabled also to rotate a predetermined amount about an axis normal to a radius of the ring 13, and located below the ring. Thus, when the silage gathering means 18 undergoes a small amount of vertical displacement, as for example, when a small dimensional variation in stationary ring 10 is encountered, gearbox 25 and its associated related components, including the drive sprocket, may change their position to minimize stress and prevent disengagement of the drive sprocket.

Referring again to FIG. 2, the drive shaft 28 is made up of a cylindrical rod-like member 38 whose ends are connected respectively to the input shaft 25b of gearbox 25 and a shaft element 39 by flexible couplings 40. The latter may be flexible hose. When pivoting of mounting member 31 about the axis of rod 36 occurs, the resilient drive shaft couplings 40 allow the drive shaft to deviate slightly from its normally straight position. The reliability of the shaft is also increased because it is less likely to break or snap in response to a shock. Furthermore, drive shaft-induced strain on the gearbox 25 is significantly reduced.

Drive shaft 28 also includes the shaft element 39 which telescopically fits within a tubular portion 41 connected with the sheave 29. The tube 41 is provided with a slot 41a which extends a substantial portion of its length. A pin 42 extends outwardly through this slot from shaft element 39, and insures that the two portions will simultaneously rotate. It will be evident the drive shaft may automatically change its length to minimize stress in response to various forces. It thus cooperates with the gearbox mounting unit when the latter device shifts its position relative to the center of the silo unloader.

Figure 6:
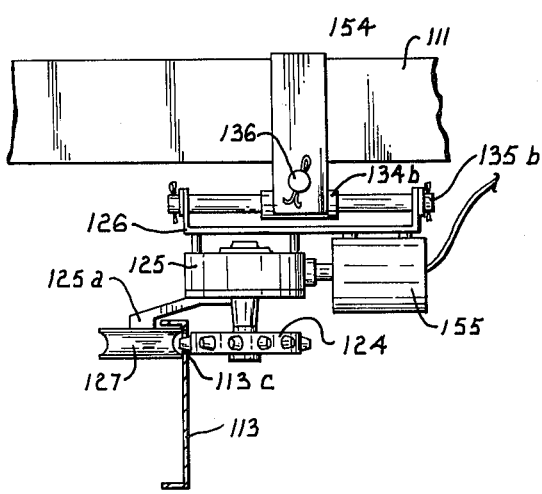
FIG. 6 is a fragmentary sectional view taken generally along line 6—6 of FIG. 5 in the direction of the arrows.
Figure 7:
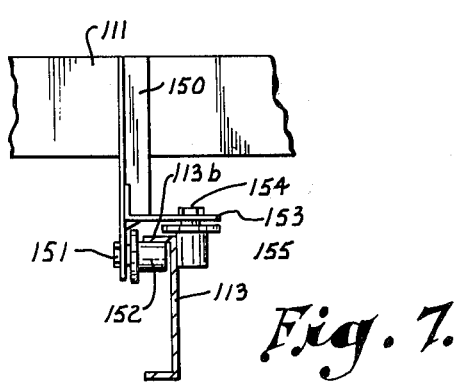
FIG. 7 is a fragmentary sectional view taken along line 7—7 of FIG. 5 in the direction of the arrows.

Referring now to a different form of the invention than the preceding embodiment, and referring to FIGS. 5, 6 and 7, in the modified form the ring is indicated by reference numeral 113 and is supported for rotary movement relative to the arms 111. The silage gathering means 118 is rigidly secured to the ring by struts 149. As in the preceding embodiment, the arms 111 are connected at their ends to cables 110.

The connection between two of the arms 111 and ring 113 is detailed in FIG. 7. To establish the connection, members 150, in the form of angle members, are secured (as by welding) to the opposite sides of the arm and depend therebelow. Each member 150 has a stub axle 151 near its lower end. A roller 152 is mounted on the stub axle. The rollers 152 underlie the upper flange 113b of the ring thereby to carry the weight of the ring.

A horizontal bracket 153 is also secured to each depending member 150. The brackets 153 extend across the top of the ring and carry vertically depending axles 154 which support rollers 155. The latter engage the inside surface of the ring.

The fit between the ring and rollers is made relatively loose in order to accommodate a limited degree of freedom of movement of the ring relative to the arms in addition to the pure rotational movement around the ring center.

The third arm 111 supports the drive means for the ring. A U-shaped bracket 154 is firmly secured to the arm with the legs of the bracket extending downwardly on opposite sides of the arm. A rod 136 extends through openings in the bracket legs and is restrained against longitudinal movement by cotter pins. A sleeve 132 is rotatably mounted on rod 136; the sleeve 132 has affixed thereto a pair of spaced, transversely oriented short sleeves 134a, 134b. The latter sleeves receive therethrough parallel rods 135a, 135b which are connected with a pan-like member 126.

The pan-like member 126 serves as a mounting base for a gearbox 125 having an output shaft on which is carried the drive sprocket 124. As in the preceding embodiment, the drive sprocket has teeth which are operative to engage within holes 113c formed near and extending around the upper portion of the ring. An arm 125a extending from the gearbox provides a rotary mount for a grooved wheel 127 which cooperates with the drive sprocket to maintain the teeth in engagement with the holes in the ring. An electric motor 155 is also mounted on the member 126 and is drivingly connected with the input shaft to the gearbox in order to provide motive power to the drive sprocket.

It should be evident that the mounting arrangement described in conjunction with the embodiment shown in FIGS. 5, 6, and 7 is essentially the inverse of that which is described in connection with the preceding embodiment. Although supported from a relatively fixed arm 111, the drive sprocket is free to move for limited distances in and out with respect to the radius of the ring (this is permitted by the sliding fit between sleeves 134a, 134b and rods 135a and 135b) and also to pivot about the axis of the rod 132. It will thus be evident that imperfections in the formation of the ring and distortions that may develop can be accommodated without interrupting the driving connection and without imposing undue stresses upon the drive components.

From the foregoing it will be seen that this invention is now well adapted to attain all the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. In a silage unloader having a non-rotating frame and a rotating silage gathering means for sweeping around the center of the frame and drawing silage toward the center of the unloader, the combination of a ring drive assembly including a ring member and a rotatable drive member engaged with the periphery of said ring member and operable to produce relative movement between said drive member and periphery of said ring member, means connecting one of said members with said non-rotating frame and means connecting the other said member with said gathering means, the means connecting the drive member to its associated structure including cooperating elements for mounting said drive member to its associated structure for movement of the drive member relative to the associated structure in the form of pivotal motion of said drive member about an axis substantially parallel to the plane of the ring and normal to a radius of the ring.

2. The combination as in claim 1,
   said ring member being connected to said gathering means and rotatable with respect to said frame.

3. The combination as in claim 1,
   said ring member being connected to said nonrotating frame.

4. In a silage unloader having a non-rotating frame and a rotating silage gathering means for sweeping around the center of the frame and drawing silage toward the center of the frame, the combination of
   a ring drive assembly including a ring member and a rotatable drive member engaged with the periphery of said ring member and operable to produce relative movement between said drive member and the periphery of said ring member, means connecting one of said members with said non-rotating frame and means connecting the other of said members with said gathering means, the means connecting the drive member to its connected structure including
   a. a support for the drive member,
   b. cooperating elements mounted respectively on said drive means and connected structure and providing a pivot axis for said support member, said pivot axis being substantially parallel to the plane of the ring and normal to a radius of the ring and at a different elevation relative to the ring member than drive member.

5. The combination as in claim 4,
   said cooperating elements including means mounting said support member for limited transverse linear movement relative to said pivot axis simultaneously with the pivotal movement of said support member about said axis.

6. The combination as in claim 4, including
   flexible drive means drivingly connected with said drive member and permitting movement of said drive member relative to the said associated structure without interruption of the application of powere thereto.

7. The combination as in claim 4,
   said ring member being connected to said gathering means and rotatable with respect to said frame.

8. The combination as in claim 4,
   said ring member being connected to said non-rotating frame.

* * * * *